United States Patent
Liu et al.

(10) Patent No.: US 10,831,463 B2
(45) Date of Patent: Nov. 10, 2020

(54) INTELLIGENT SOFTWARE DEPLOYMENT ON AN IAAS PLATFORM

(71) Applicant: INTERNATIONAL BUSINESS MACHINES CORPORATION, Armonk, NY (US)

(72) Inventors: Xiao B. Liu, Beijing (CN); Yi B. Wang, Beijing (CN); Xin Yang, Beijing (CN); Chao Yu, Ningbo (CN); Jin R. Zhao, Ningbo (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 265 days.

(21) Appl. No.: 15/453,105

(22) Filed: Mar. 8, 2017

(65) Prior Publication Data

US 2018/0260201 A1    Sep. 13, 2018

(51) Int. Cl.
*G06F 8/61*    (2018.01)
*G06F 11/14*    (2006.01)
(Continued)

(52) U.S. Cl.
CPC ............ *G06F 8/61* (2013.01); *G06F 11/0778* (2013.01); *G06F 11/1433* (2013.01);
(Continued)

(58) Field of Classification Search
CPC .................. G06F 8/60–66; G06F 11/36–3696
See application file for complete search history.

(56) References Cited

U.S. PATENT DOCUMENTS 7,669,199 B2    2/2010   Cope et al.
8,434,080 B2    4/2013   Yendluri
(Continued)

FOREIGN PATENT DOCUMENTS

CN        104951360 A      9/2015
WO    2015165111 A1     11/2015

OTHER PUBLICATIONS

Brest, Janez, and Viljem Zumer. "A comparison of the static task graph scheduling algorithms." Proceedings of the 23rd International Conference on Information Technology Interfaces, 2001. ITI 2001 . . . IEEE, 2001. (Year: 2001).*

(Continued)

*Primary Examiner* — Doon Y Chow
*Assistant Examiner* — Joanne G Macasiano
(74) *Attorney, Agent, or Firm* — Michael O'Keefe; Matthew M. Hulihan; Heslin Rothenberg Farley & Mesiti PC

(57) ABSTRACT

A method obtains a task tree for a deployment job to deploy application(s) to a compute infrastructure, the task tree indicating tasks to execute the deployment job. The method also obtains script(s) and configuration information for executing the script(s). The method simulates an installation process using the task tree and provides a refined task tree. The method invokes the installation process of the deployment job, the installation process including execution of the tasks of the deployment job and using the refined task tree. The method backtracks the installation process after recognizing an error, pausing the installation process and applying an adjustment to the refined task tree to resolve the error. The installation process resumes from a prior point using the refined task tree with the applied adjustment. Based on successful completion of the installation process, the method (Continued)

provides an adjusted refined task tree as an optimized task tree.

20 Claims, 11 Drawing Sheets

(51) Int. Cl.
*G06F 11/36* (2006.01)
*G06F 11/26* (2006.01)
*G06F 11/07* (2006.01)

(52) U.S. Cl.
CPC ........ *G06F 11/1471* (2013.01); *G06F 11/261* (2013.01); *G06F 11/3664* (2013.01); *G06F 2201/84* (2013.01)

(56) References Cited

U.S. PATENT DOCUMENTS

| | | | |
|---|---|---|---|
| 8,484,637 B2* | 7/2013 | Farhangi | G06F 8/62 717/121 |
| 8,762,965 B2 | 6/2014 | Alpern et al. | |
| 8,997,088 B2 | 3/2015 | Gurikar et al. | |
| 9,052,961 B2 | 6/2015 | Mangtani et al. | |
| 9,454,359 B2 | 9/2016 | Hicks et al. | |
| 9,519,472 B2 | 12/2016 | McLeod et al. | |
| 2005/0132350 A1* | 6/2005 | Markley | G06F 8/65 717/168 |
| 2007/0143446 A1 | 6/2007 | Morris | |
| 2008/0201705 A1 | 8/2008 | Wookey | |
| 2008/0250405 A1* | 10/2008 | Farhangi | G06F 8/61 717/177 |
| 2009/0265586 A1* | 10/2009 | Fitoussi | G06F 8/61 714/48 |
| 2010/0031248 A1* | 2/2010 | Sonkin | G06F 8/61 717/174 |
| 2012/0102486 A1 | 4/2012 | Yendluri | |
| 2013/0132950 A1 | 5/2013 | McLeod et al. | |
| 2013/0232498 A1 | 9/2013 | Mangtani et al. | |
| 2014/0215452 A1 | 7/2014 | Hicks et al. | |

OTHER PUBLICATIONS

Kwok, Y-K., and Ishfaq Ahmad. "Benchmarking the task graph scheduling algorithms." Proceedings of the First Merged International Parallel Processing Symposium and Symposium on Parallel and Distributed Processing. IEEE, 1998. (Year: 1998).*

Yu, Xiangdong, and Dipak Ghosal. "Optimal dynamic scheduling of task tree on constant-dimensional architectures." Proceedings of the fourth annual ACM symposium on Parallel algorithms and architectures. 1992. (Year: 1992).*

Mell, Peter, et al., "The NIST Definition of Cloud Computing", NIST Special Publication 800-145, Sep. 2011, Gaithersburg, MD, 7 pgs.

* cited by examiner

INTELLIGENT SOFTWARE DEPLOYMENT ON AN IAAS PLATFORM

BACKGROUND

The needs of enterprise users for open source and other types of software grows quickly with the rapid developments in cloud computing and open source software. However, it may be complex and difficult to establish, e.g. install and configure, suitable frameworks such as Openstack, an open source platform for cloud computing, or Kubernetes, an open source container cluster manager, as examples. It is usually necessary to manually execute a series of scripts and implement configurations according to the physical environment. The entire installation process usually demands a relatively high level of professional skill. In addition, installation scripts usually have internal and/or external dependencies, such as packages or permissions. If execution of a current script fails, for example because of the inability to access a dependency or because of lack of permissions leading to the denial of access to a software source, subsequent scripts may be obstructed. For ordinary users, it can take a significant amount of effort to resolve obscure script errors.

Enterprise users are more likely to deploy an application in a cloud environment. An administrator may persist common application(s) in customized images, but this lacks flexibility and is a drawback if requirements change. Infrastructure-as-a-Service (IaaS) orchestration tools are becoming increasingly popular for large-scale clustered application deployment. Example such tools include Openstack Heat to orchestrate cloud applications using templates, and Vagrant for portable virtual development environments. These engines depend on a variety of scripts that are either directly embedded into a template or integrated with Puppet, an open-source software configuration management tool, Ansible, for automating cloud provisioning, configuration management, and application deployment, and/or Saltstack, for configuration management and remote execution, as example tools. However, installation scripts are often not verified, and many of them are not applicable in a private cloud environment.

SUMMARY

Shortcomings of the prior art are overcome and additional advantages are provided through the provision of a computer-implemented method. The method obtains a task tree for a deployment job to deploy application(s) to a compute infrastructure, the task tree indicating tasks to execute the deployment job. The method also obtains script(s) and related configuration information for executing the script(s), the script(s) being for execution to perform the tasks indicated by the task tree. The method simulates an installation process of the deployment job using the task tree, the simulating including refining the task tree based on feedback from the simulated installation process, and the refining providing a refined task tree. Based on successful simulation of the installation process, the method invokes the installation process of the deployment job, the installation process including execution of the tasks of the deployment job and using the refined task tree. The method backtracks at least a portion of the installation process based on recognizing an error, the error recognized based on analyzing logged information about the installation process. The backtracking includes pausing the installation process and applying an adjustment to the refined task tree to resolve the error. The backtracking also includes backtracking at least a portion of the installation process to a prior point and resuming the installation process from the prior point using the refined task tree with the applied adjustment. Based on successful completion of the installation process, the method provides an adjusted refined task tree, incorporating the applied adjustment, as an optimized task tree for the deployment job.

Further, a computer program product including a computer readable storage medium readable by a processor and storing instructions for execution by the processor is provided for performing a method. The method obtains a task tree for a deployment job to deploy application(s) to a compute infrastructure, the task tree indicating tasks to execute the deployment job. The method also obtains script(s) and related configuration information for executing the script(s), the script(s) being for execution to perform the tasks indicated by the task tree. The method simulates an installation process of the deployment job using the task tree, the simulating including refining the task tree based on feedback from the simulated installation process, and the refining providing a refined task tree. Based on successful simulation of the installation process, the method invokes the installation process of the deployment job, the installation process including execution of the tasks of the deployment job and using the refined task tree. The method backtracks at least a portion of the installation process based on recognizing an error, the error recognized based on analyzing logged information about the installation process. The backtracking includes pausing the installation process and applying an adjustment to the refined task tree to resolve the error. The backtracking also includes backtracking at least a portion of the installation process to a prior point and resuming the installation process from the prior point using the refined task tree with the applied adjustment. Based on successful completion of the installation process, the method provides an adjusted refined task tree, incorporating the applied adjustment, as an optimized task tree for the deployment job.

Yet further, a computer system is provided that includes a memory and a processor in communications with the memory, wherein the computer system is configured to perform a method. The method obtains a task tree for a deployment job to deploy application(s) to a compute infrastructure, the task tree indicating tasks to execute the deployment job. The method also obtains script(s) and related configuration information for executing the script(s), the script(s) being for execution to perform the tasks indicated by the task tree. The method simulates an installation process of the deployment job using the task tree, the simulating including refining the task tree based on feedback from the simulated installation process, and the refining providing a refined task tree. Based on successful simulation of the installation process, the method invokes the installation process of the deployment job, the installation process including execution of the tasks of the deployment job and using the refined task tree. The method backtracks at least a portion of the installation process based on recognizing an error, the error recognized based on analyzing logged information about the installation process. The backtracking includes pausing the installation process and applying an adjustment to the refined task tree to resolve the error. The backtracking also includes backtracking at least a portion of the installation process to a prior point and resuming the installation process from the prior point using the refined task tree with the applied adjustment. Based on successful completion of the installation process, the method provides an adjusted refined task tree, incorporating the applied adjustment, as an optimized task tree for the deployment job.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein is an intelligent solution for deployment (installation and configuration) of application(s) in a cloud environment, for instance on an IaaS or other cloud platform. Examples herein are presented in the context of open source application installation, as open source applications are a type that typically have scripts and packages provided by a community and are placed into accessible repositories. However, aspects described herein can work with various other types of applications as well. The installation process of a deployment job may be continuously improved through the integration of enterprise internal resources into an experience repository used to help accelerate and more accurately provide the installation process for later deployments.

Figure 1:
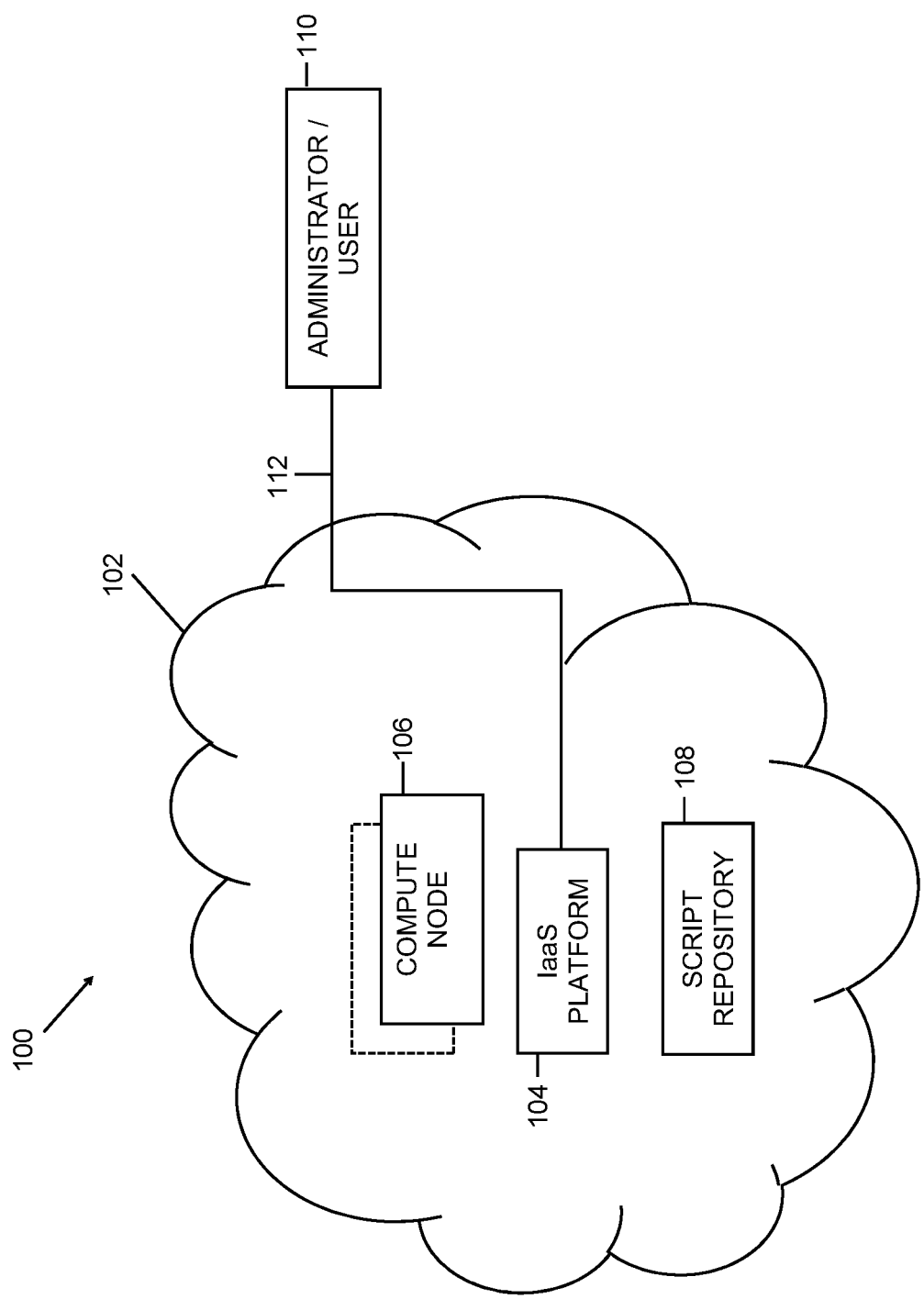
FIG. 1 depicts an example environment to incorporate and use aspects described herein.

FIG. 1 depicts an example environment 100 to incorporate and use aspects described herein. Environment 100 includes a cloud environment 102 providing cloud-based processing and related facilities, and administration/management thereof. Cloud environment 102 includes an IaaS platform 104 supported by compute node(s) 106, and a script repository 108 described in further detail below.

An administrator or other user, represented by an administrator/user system 110 in FIG. 1, communicates with the IaaS platform 104 via the interne or other network(s) across communications link 112 to initiate, effect, and manage a deployment job that deploys, e.g. installs and configures, application(s) to a compute infrastructure, for instance the IaaS platform 104 and compute node(s) 106 supporting the IaaS platform 104.

The components in FIG. 1 form wired or wireless network(s) of devices, and communication between the devices takes place via wired or wireless communication links for communicating data between the devices. More generally, lines, with or without arrows, extending between components in the drawing figures indicate communication links/paths between those components for communicating data therebetween.

FIG. 1 is just one example of an environment to incorporate and use aspects described herein; many other examples are possible and contemplated as being compatible with the capabilities described herein.

In accordance with aspects described herein, a deployment or installation job may be separated into execution jobs, which may include multiple scripts, with each script having multiple script fragments. A task tree provides relationships between the execution jobs and indicates the several tasks to execute the deployment job to deploy the subject application(s). A simulation pre-executes the task tree in the IasS platform to simulate an installation process of the deployment job. Virtual machines or containers, as examples, may be used to simulate the installation and refine the task tree, which can lead to higher installation success rate during the real or actual installation process. In this manner, the simulation helps refine the task tree, underlying scripts and/or script fragments, related configuration information, and address errors, all prior to the actual installation/deployment. In addition, the administrator or other user may interact with the simulation to address errors that arise during the simulation. The actions, configurations, or the like, that are used to address the errors can be cached in an experience repository, which can also assist in the optimization and integration of the scripts and script fragments to improve installation success rate and efficiency for future deployments.

Figure 2:
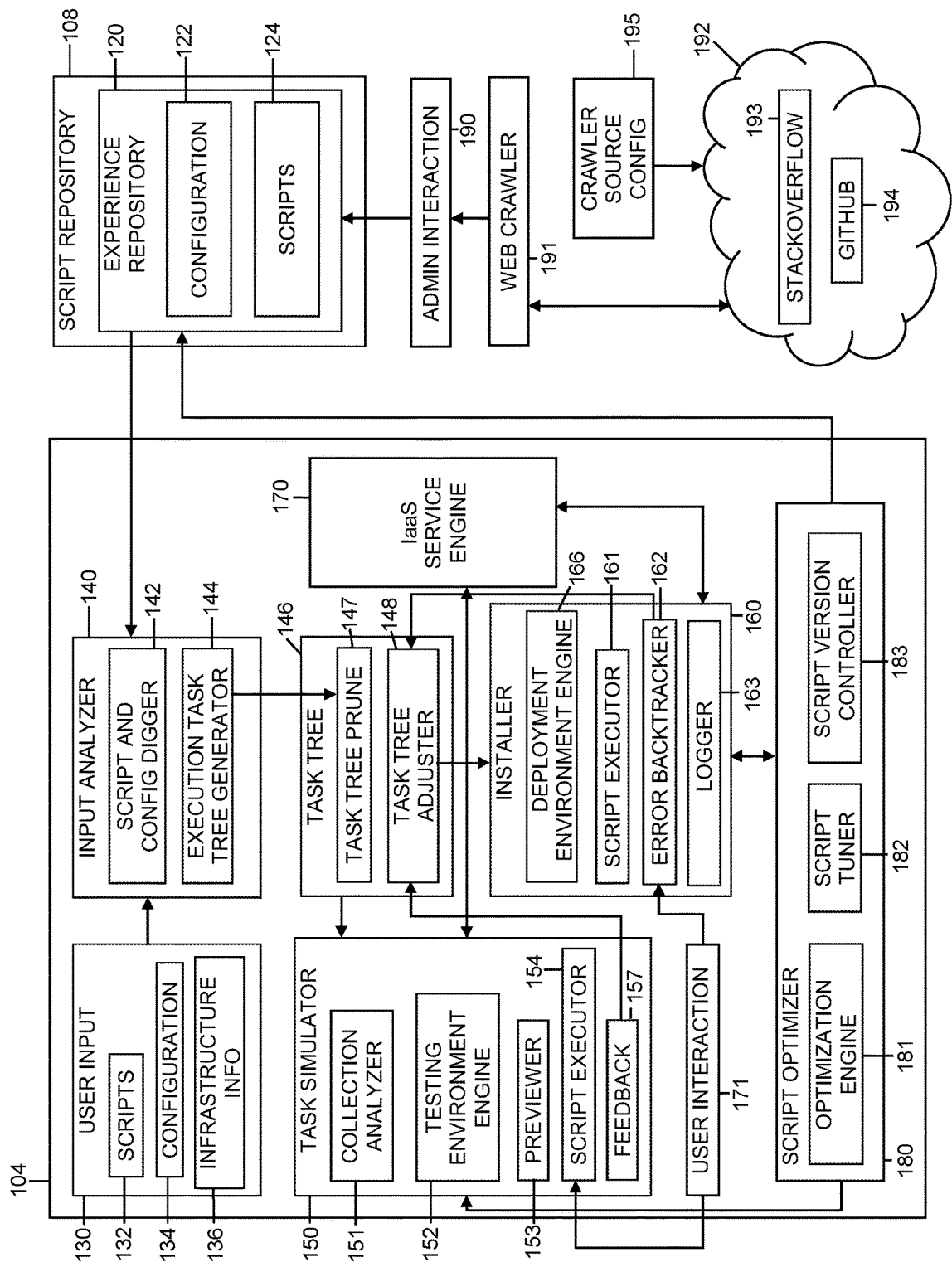
FIG. 2 depicts further details of aspects of the environment of FIG. 1, in accordance with aspects described herein.

FIG. 2 depicts further details of aspects of the environment of FIG. 1, in accordance with aspects described herein. The script repository 108 builds-out over time an experience repository 120 including configurations 122 and scripts 124. Over time, a user/administrator, in an effort to run deployment jobs, provides user input 130, such as script(s) 132, related configuration information 134, and infrastructure information 136, to an input analyzer 140. The infrastructure information 136 may indicate necessary or desired infrastructure characteristics. The user can set parameters/requirements via this information, or a default configuration, for instance from the experience repository 120, may be used. As the script repository 108 is built-out with optimized information for running deployment jobs, the user can invoke jobs for which the details, such as the appropriate scripts and configuration information, are pulled from the experience repository 120, instead of the user having to supply that information as input. A benefit is that these refined and optimized scripts, script fragments, and configurations can be selected and used when completing the deployment jobs, leading to higher deployment success rates, better efficiencies, and decreased errors and error-handling because these components pieces of the deployment have been refined and tested.

The input analyzer 140 analyzes the user input and/or information from the script repository 108. A script and configuration digger 142 analyzes the input, parsing it for an execution task tree generator 144 that generates the task tree of tasks to execute the deployment job. The task tree generator 144 feeds the task tree to a task tree component 146.

Figure 3:
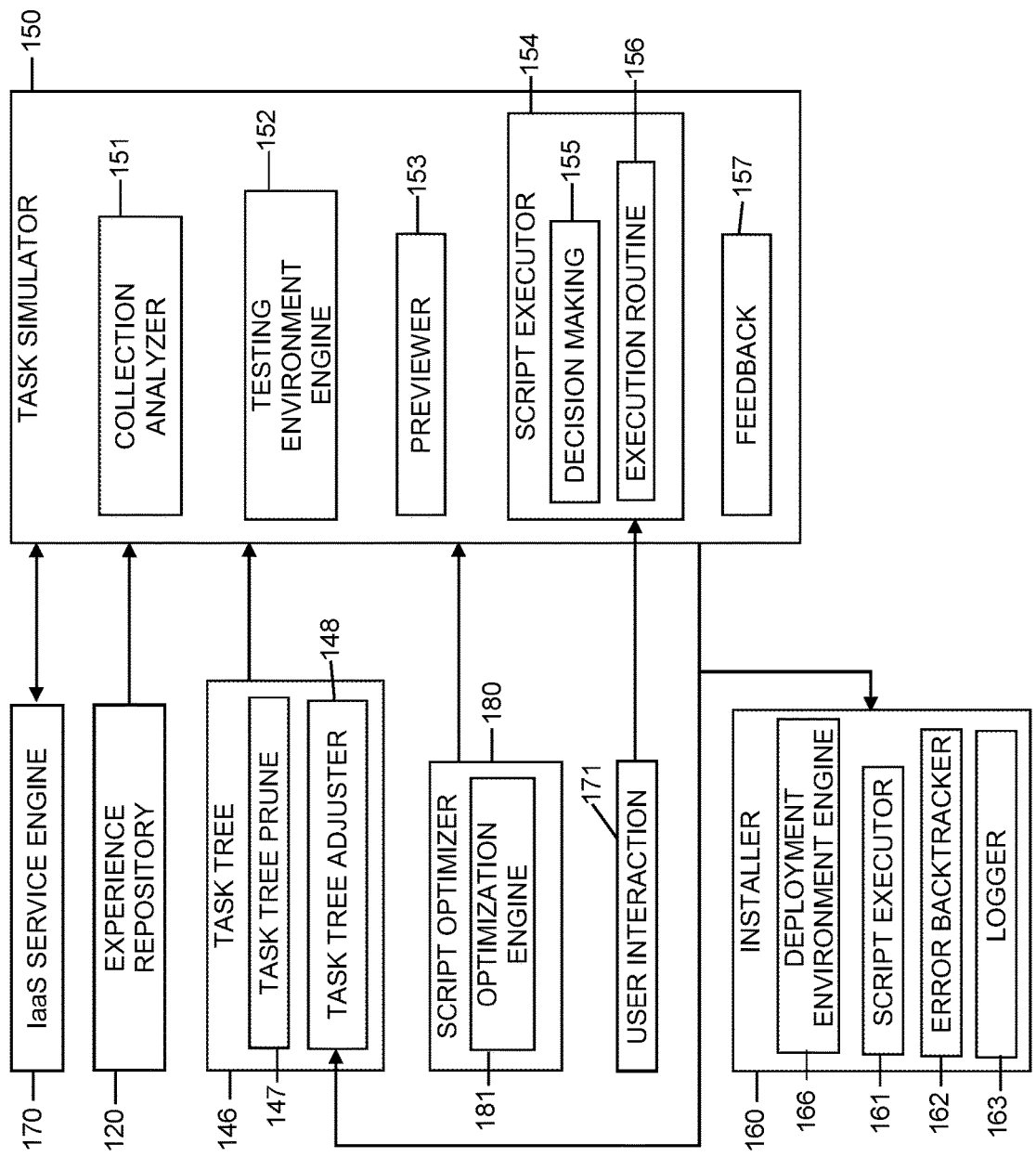
FIG. 3 depicts further details of a task simulator in accordance with aspects described herein.
Figure 4:
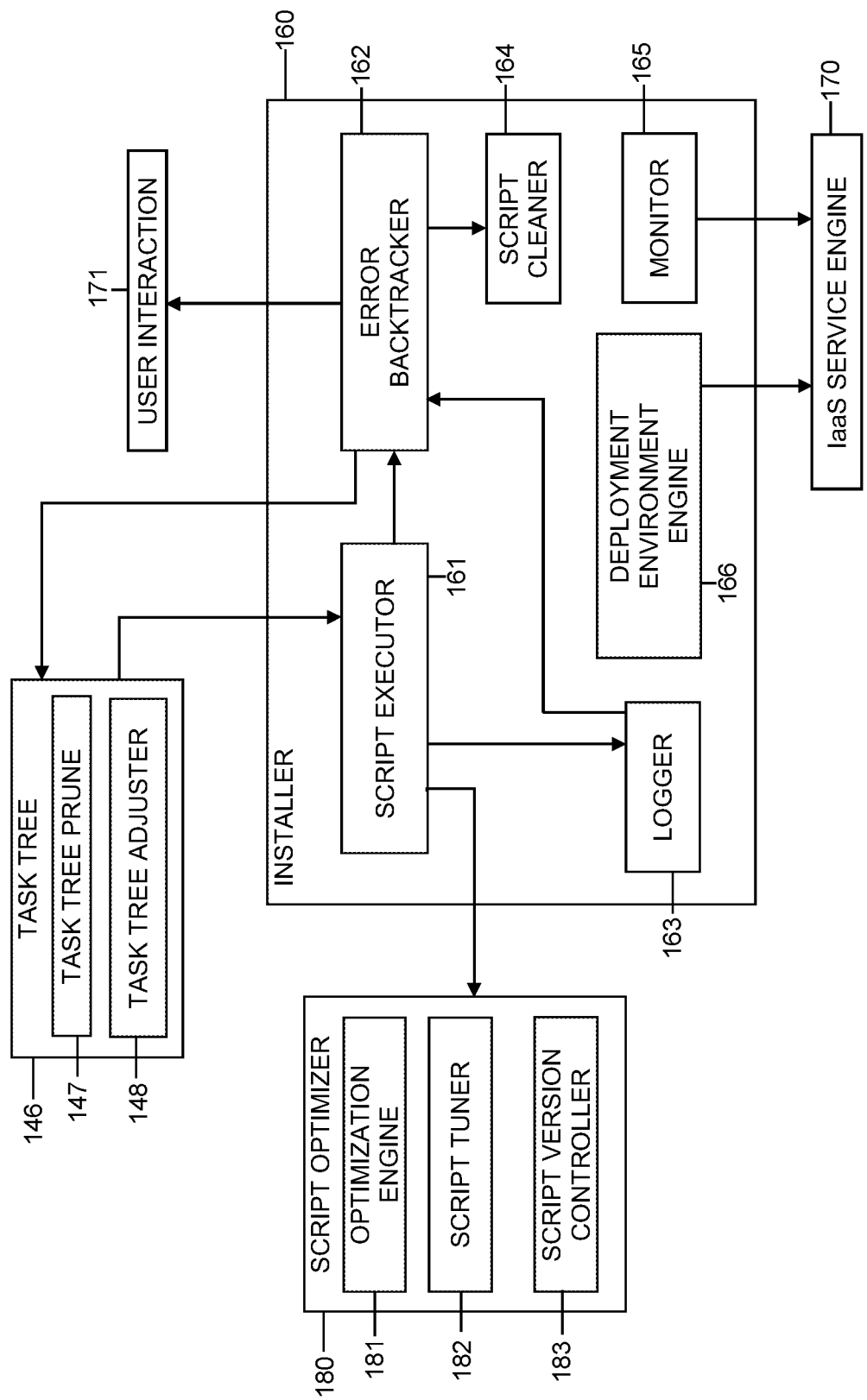
FIG. 4 depicts further details of an installer in accordance with aspects described herein.
Figure 5:
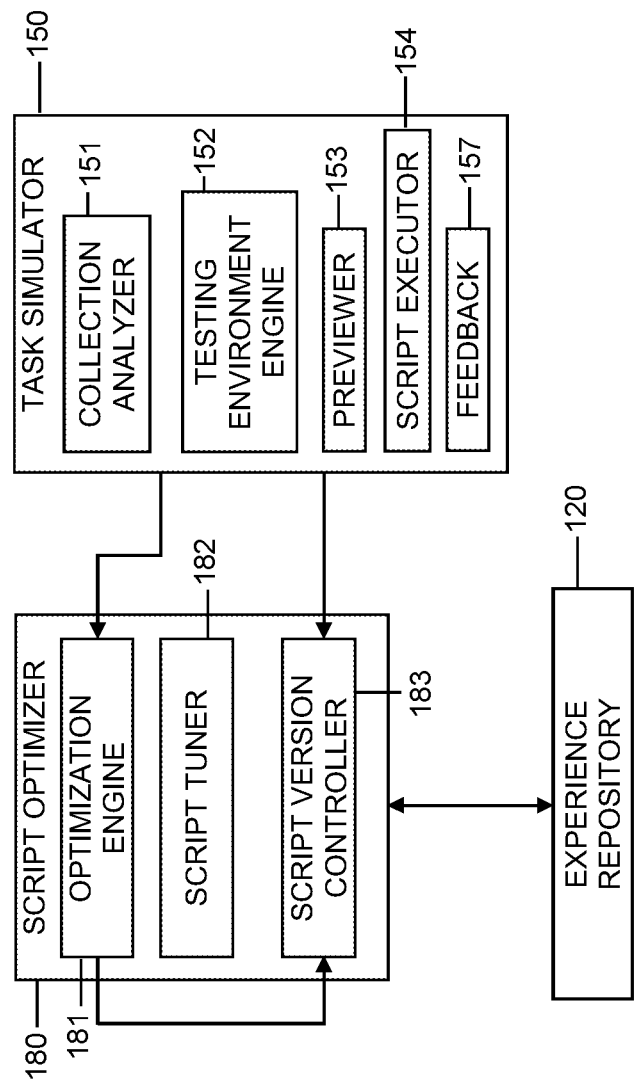
FIG. 5 depicts further details of a script optimizer in accordance with aspects described herein.

Additional modules of FIG. 2 are described with further reference to FIGS. 3-5. FIG. 3 depicts further details of a task simulator 150 in accordance with aspects described herein. The task simulator 150 includes a collection analyzer 151, testing environment engine 152, previewer 153, script executor 154, and feedback component 157.

The task tree component 146 collects scripts, installation package(s), and configuration files indicated by the task tree for the deployment job. The collection analyzer 151 analyzes these items to determine candidate installation configuration modes under which to execute the deployment process. A user can select from these different configuration installation modes to place an emphasis on different factors or goals for the deployment. One mode might be configured to produce a relatively high (i.e. higher than other modes) installation success rate, while another mode may emphasize completing the job using the fewest number of packages, and yet another mode may emphasize the fastest installation possible for the job but produce a lower average installation success rate. The collection analyzer 151 can analyze the task tree and consider some key factors, such as installation success rate, numbers of installation packages, and installation environment dependencies, as examples, through the experience repository 120 to develop installation strategies and determine the different configuration installation modes. The collection analyzer 151 obtains statistics such as the installation time needed, installation success rate, number of installation packages, and installation environment dependencies, among any other desired information, for various installation modes.

The collection analyzer 151 can also provide related configuration information for a simulation environment to be established by a backend IaaS service engine 170. The collection analyzer 151 can provide to the IaaS service engine 170 related configuration information about a testing environment to use for simulating the installation process. The related configuration information may be environmental requirement information that the IaaS service engine 170 relies on for an indication of at least some testing environment parameters. The IaaS service engine 170 provides the testing environment, which may include virtual machines, containers, or other facilities as examples. Accordingly, the testing environment engine 152 sends the related environment requirement information to the IaaS service engine 170 to inform of the test environment parameters and receives in return information about the test environment that will help the collection analyzer 151 assemble and present the candidate configuration modes to the user. The IaaS sets up an environment based on the information passed to it, but the IaaS also makes its own implementation decisions. For instance, if the parameters specify a requested number of virtual machines, the IaaS may make an implementation decision to provide them on one host or on separate hosts. Hence, the IaaS makes decisions about how to implement a requested environment and provides some information back to the task simulator 150 about the testing environment. In some examples, the infrastructure information from the IaaS service engine 170 informs of anticipated execution statistics of executing the deployment job under each of the candidate installation configuration modes. The statistics for the different modes may be based in part on the state of the IaaS, such as resources available, so real-time inquiry to the IaaS service engine 170 is taken into account when estimating performance statistics about job installation under the different modes.

The previewer 153 shows information to the end user about the different candidate installation configuration modes for the user to make a decision about the mode to use. This information can include information about the test environment, estimated installation time, installation success rate, number of installation packages, dependencies of the test environment, and/or any other desired information. The end user uses this information for software installation decision-making, which includes making a selection as to which installation configuration mode to use for the simulation.

An execution routine component 156 of the script executor 154 simulates the installation process of the deployment job using the task tree and in part based on decision(s) made by the user, which can include the selected installation configuration mode and any updates and refinements made via the decision making component 155 during the process of simulated installation. Updates and refinements can include those made before and/or during the simulated installation process. Example tweaks made before the simulated installation process include changes/updates to an installation policy before the simulation, for example to switch away from defaults. Other tweaks include specification of ports for accessing a database, addresses of components, and other information that may be job-specific. During the simulation process, the user might tweak items based on feedback 157 provided to the end user, with these tweaks helping to resolve errors. A user interacts with the various components as indicated by user interaction 171. Eventually, the task tree adjuster 148 of the task tree component 146 has a finalized task tree that it then presents to the installer component 160.

Success of a simulated installation process is judged by whether it satisfies some adjustable 'success criteria', which may specify a maximum number of errors allowed for the simulated install process, as an example. In some examples, the end user provides an indication or confirmation when/that the simulated installation process was successful. Upon successful simulated installation, the script executor 154 saves related verified task trees and scripts and sends this to the installer module for real deployment as described below.

If there are errors in the simulated process, the task simulator 150 can send the feedback 157 to the task tree adjuster to further optimize the related task tree that is the subject of the simulation.

FIG. 4 depicts further details of an installer in accordance with aspects described herein. The installer 160 includes a script executor 161, error backtracker 162, logger 163, script cleaner 164, monitor 165, and deployment environment engine 166. The installer component 160, specifically the script executor 161, obtains as input installation task(s), e.g. as a task tree, from the task tree component 146 and executes the installation jobs as indicated in the task tree. The tree can include nodes, each node being an installation job effected by execution of script(s)/script fragment(s). The script executor 161 in the installer 160 executes the nodes of the task tree. The deployment environment engine 166 invokes an IaaS service engine application programming interface (API) of IaaS service engine 170 to provide an appropriate environment for the deployment. This may be the same environment or a different environment than the testing environment used for the simulated installation process. In this regard, the simulation can utilize the IaaS, in which the IaaS provisions resources, such as virtual machines (VMs), etc. for the simulation. However, in some scenarios, the simulated installation process may be on a reduced-scale as compared to the actual installation to be performed for the deployment job. The task tree prune component 147 of the task tree component 146 can initially prune the initial task tree to reduce the scale of the installation process of the deployment job. The simulation of the installation process can simulate the installation process for the reduced-scale. After simulating the installation process on the reduced-scale to refine and optimize the task tree, it can then be scaled back up to the desired size for actual installation. As an example, the deployment job may call for a relatively large deployment (say 100 virtual machines or other workers) that may be impractical to simulate. The simulation could operate on fewer VM instances, say 1 or 10, optimize the tree and provide the desired learning for the experience repository for later actual installations, then scale back up to the desired 100 VMs.

When the installation process meets error, the process can stop or pause and send error message(s) to the error backtracker 162 for further analysis. The error backtracker 162 obtains via the logger 163 recorded information to analyze and track errors and adjust the task tree. The logger 163 is in charge of recording details of the process and returning information during the installation process that serves as a foundation of the error backtracking.

The monitor 165 collects IaaS common issues as information from the IaaS service engine 170, such as 'out of memory', 'out of disk space', 'network unable to connect', as examples, which can help the error backtracker 162 to refine scripts or script fragments to adjust the task tree. This information can be logged as hardware and connectivity information about the compute infrastructure, such as memory, disk space, and network connectivity information.

The error backtracker 162 dynamically adjusts the task tree to adjust task(s) during the actual installation by, as examples, (i) adjusting node(s) of the task tree corresponding to the task(s), (ii) adjusting script(s) configured for execution to perform at least a portion of the task(s), (iii) adjusting script fragment(s) configured for execution to perform at least a portion of the task(s), and/or (iv) adjusting a portion of the configuration information related to the script(s) or script fragment(s) configured for execution to perform at least a portion of the task(s).

The script cleaner 164 cleans the source script(s) for the particular installation where necessary to clear incorrect information included therein, perhaps due to some error or incorrect installation being included in the script(s).

After an adjustment to the task tree, the resulting adjusted task tree serves as new input for the script executor 161 to fulfill the installation. If the error that gave rise to a particular adjustment is fatal enough, the installation may need to be restarted. However, generally it is desired to backtrack to a prior point and resume the installation process where possible. There may have been a significant amount of setup and tasks already completed that would take time and resources to perform again if the installation was to be restarted completely.

When the error backtracker 162 is unable to automatically solve an installation error, user interaction 171 allows a user to analyze the error information and manually make adjustment(s) the task tree.

Thus, the installation process can involve backtracking at least a portion of the installation process based on recognizing an error. The error may be recognized based on analyzing logged information about the installation process. Backtracking can include pausing the installation process and applying an adjustment to the refined task tree (i.e. refined from simulation) to resolve the error, and backtracking at least a portion of the installation process to a prior point, then resuming the installation process from the prior point using the refined task tree with the applied adjustment. There may be several occurrences during a single installation process when the process is backtracked to make adjustments to the task tree and related information and then resumed.

Based on successful completion of the installation process, the process can provide an adjusted refined task tree, incorporating any applied adjustments, as an optimized task tree for the deployment job. For instance, when the installation is successful, the results can be fed back as output to a script optimizer 180. Results from the script optimizer can be saved as experience information in a knowledge database, e.g. the script repository 108. Specific results that are saved can include the task nodes of the task trees, which include script(s) and/or script fragment(s) fragments and/or the related configuration information for those scripts. These items can be saved with various level of granularity, enabling components and sub-components (e.g. scripts and script fragments) to be used individually or in combination depending on the particular tasks needed to complete a given deployment job.

Accordingly, installation tasks can be broken into script fragments, and an intelligent script executor 161 may be in charge of executing and verifying these script fragments. An error backtracker component 162 can help the script executor 161 by adjusting the task tree to automatically address common issues through logger 163 and monitor 165 feedback, such as dependency errors, hardware errors such as out of memory or out of disk space, and/or network connectivity issues, as examples.

FIG. 5 depicts further details of a script optimizer in accordance with aspects described herein. The script optimizer 180 includes an optimization engine 181, script tuner 182, and script version controller 183. Generally, the script optimizer works on scripts (meaning entire scripts and/or individual fragments thereof), taking as input scripts, configuration files, and script installation logs, as examples. The installer 160 can push (see FIG. 4) an optimized script to the optimization engine 181. The script optimizer calls the script tuner 182 to obtain the optimized script (the script that the installer provided as a result of a successful installation). The tuner 182 can upload the related configuration file (configuration information developed during installation and provided as part of, or with, the optimized script) to a resource warehouse, for example a repository, and embed corresponding resource access code in the script, which is code to access the configuration file at the resource warehouse when the script is run. The script tuner can also extract useful messages such as warnings and errors from script installation logs to further tune the script.

The script tuner 182 also calls the task simulator 150 module to score different script versions (e.g. before and after optimization) as needed. The scoring can score the adjusted script (adjusted during the installation) and the initial script (pre-adjustment) to determine, as between the two, a preferred version of the script. They may be scored against each other on any of various markers, with a default, such as execution time of the script, being applied but subject to modification by the user. In this manner, the task simulator 150 can test the optimized script for comparison to the prior version to determine whether the adjustments provide an overall benefit. The scoring may be performed by the task simulator 150, which then passes the results to the optimization engine 180, in one example.

The script version controller 183 obtains scripts, such as the higher-scoring 'preferred' script of the initial script and its adjusted version, from the optimization engine 181 and interacts with the experience repository 120. Alternatively, the script version controller 183 obtains an indication of the preferred script (the highest scoring script/fragment from the task simulator 150) and then reaches out to the optimization engine 181 to obtain that script. In any case, the script version controller 183 can update the experience repository 120 to version the scripts/fragments in the experience repository 120, thus recording and providing a history of the script/fragment.

An example process of the script version controller 183 is as follows: It checks whether the experience repository 120 contains an existing version of the preferred script determined above. If such script does not exist in the experience repository 120, the script version controller 183 pushes the preferred script into the experience repository 120. Otherwise, if an existing version of that script does exist in the experience repository 120 and does not have an associated task simulation score, the process calls the task simulator 150 to score it and provide a result. Then, or if the existing version of the script in the experience repository 120 already has an associated task simulation score, the process determines whether to push the preferred version of the script to the repository, in other words replace the existing script with the preferred version of the script determined above. This decision may be based on which version of the script—the preferred or the existing—scores higher in the simulation.

In some examples, the script tuner 182 receives script fragments of one or more scripts and performs the scoring on a fragment-by-fragment basis. The process described above continues with script fragments, whereby the script version controller maintains versions of the individual scripts fragments.

As is seen from the above, the experience repository 120 caches available, refined and optimized scripts/fragments and their installation factors, such as installation success rate and numbers of packages, and the script version controller 183 compares cached scripts/fragments in the experience repository 120 to newly generated scripts being optimized based on the installation processes. This produces an evolving script repository of optimized scripts and script fragments that can be tapped into for future deployments to more efficiently deploy desired applications.

Referring back to FIG. 2, the experience repository 120 is optimized by the script optimizer module 180. Additionally, administrator interaction 190 may populate the repository 120 with scripts, configuration information, etc. discovered by a web crawler 191 that crawls content on the web (e.g. internet) and/or other networks 192. For instance, the web crawler may crawl knowledge markets or repositories 193 and 194 to discover this information. The crawler source configuration 195 provides the configuration for the crawling performed by the web crawler 191. Administrator interaction 190 provides administrator oversight and filtering of the information discovered by the crawler 191 and the information that ultimately is selected and placed into the experience repository 120. It is noted that information discovered through this crawling may factor into refinements and optimization to task trees, scripts, fragments, and related configuration information use in deployment jobs since this information may be drawn in as input (via the input analyzer and task tree component) to the task simulations.

In accordance with aspects described herein, a task simulator provides a simulation aspect to pre-test deployment in the cloud environment, helping to refine the task tree so that installation success rate will be higher. During the actual deployment, an error backtracking aspect helps to address and resolve some errors so that they do not permeate the installation and potentially require resolution post-installation.

Further provided is customized interaction in which an administrator or other user can adjust the installation modes and tasks to meet customized requirements.

Additionally, a deployment job can be broken down into reusable script fragments, with an experience repository caching these reusable fragments that are also refined during task simulation and/or optimized during an actual deployment process. In some examples, these aspects can be embedded into an IaaS orchestration engine, such as Puppet, Ansible, or Saltstack to enrich IaaS template technology. Current IaaS orchestration engines may focus on how to establish a framework based on certain configuration files, but fail to consider execution scripts as script fragments, and script verification. Aspects described herein provide simulated application installation, error backtracking, and optimization of installation scripts and fragments, which can enrich these orchestration engines, and more generally the deployment of software on an IaaS or other platform.

Figure 6:
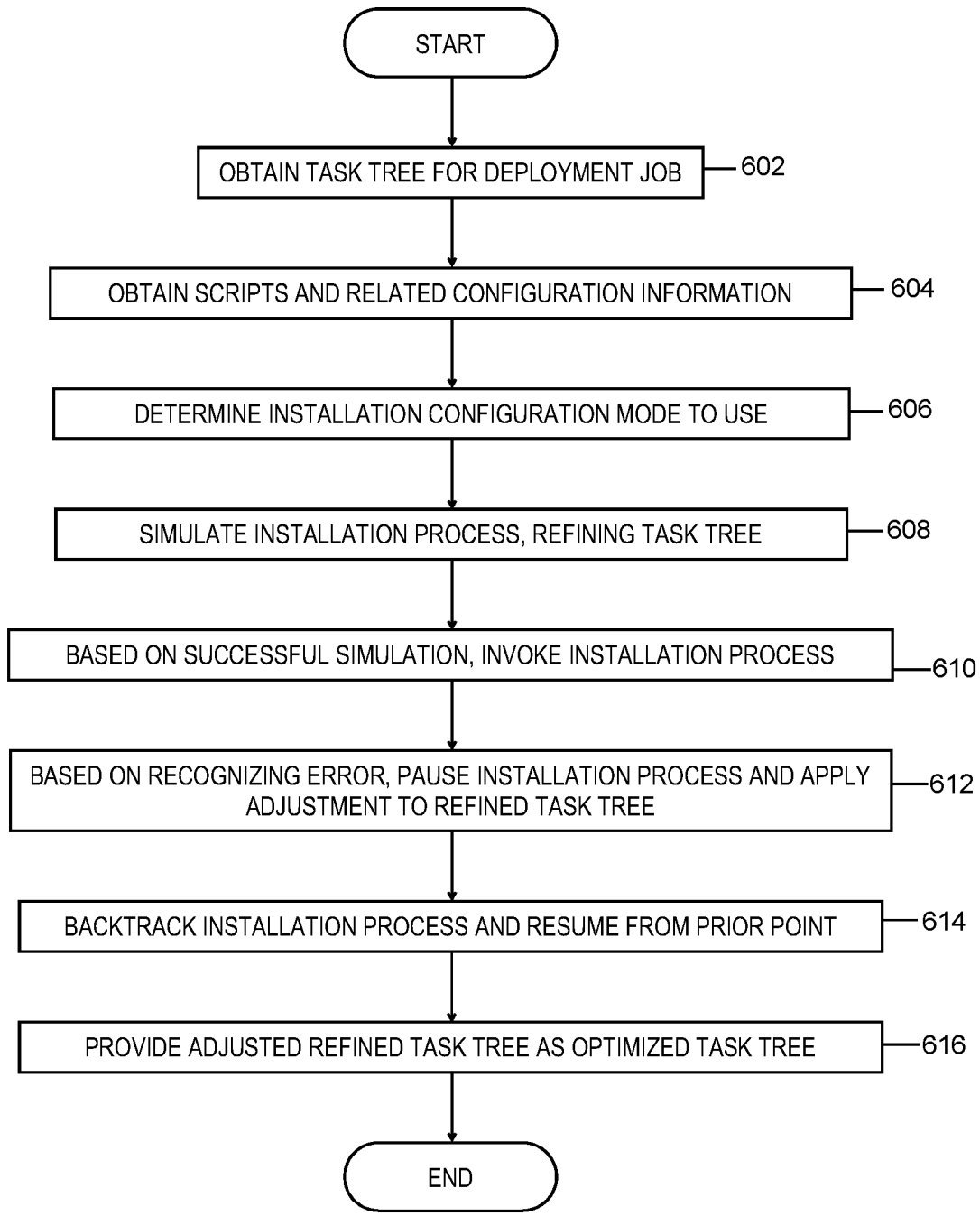
FIG. 6 depicts an example process for intelligent software deployment, in accordance with aspects described herein.

FIG. 6 depicts an example process for intelligent software deployment, in accordance with aspects described herein, for instance on an IaaS platform (though the deployment may be to other types of platforms in other examples). In some examples, the process is performed by one or more computer systems, such as those described herein, which may include one or more cloud servers of an IaaS Platform, and/or one or more other computer systems. The process begins by obtaining a task tree (602) for a deployment job to deploy one or more applications to a compute infrastructure. The task tree indicates a plurality of tasks to execute the deployment job. The process continues by obtaining one or more scripts and related configuration information (604) for executing the one or more scripts, the one or more scripts being for execution to perform the plurality of tasks indicated by the task tree. The process then determines an installation configuration mode to use (606). An example of this determination is depicted and described with reference to FIG. 7.

Continuing with FIG. 6, the process simulates an installation process of the deployment job using the task tree, which simulating includes refining the task tree based on feedback from the simulated installation process, and the refining providing a refined task tree (608). In some examples, the process provides to a user the feedback about the simulated application installation process, and the refining refines the task tree based on user interaction in response to that feedback. This may repeat one or several times.

Eventually, based on successful simulation of the installation process, the process invokes the installation process of the deployment job (610). The installation process includes execution of the plurality of tasks of the deployment job and uses the refined task tree. The process of FIG. 6 can backtrack at least a portion of the installation process based on recognizing an error, as part of the installation process. This error recognition may be based on analyzing logged information about the installation process. The backtracking based on recognizing an error includes, referring to FIG. 6, pausing the installation process and applying an adjustment to the refined task tree to resolve the error (612). The backtracking then backtracks at least a portion of the installation process to a prior point and resumes the installation process from the prior point using the refined task tree with the applied adjustment applied to it (614). In some examples, the logged information about the installation process includes hardware and connectivity information about the compute infrastructure, for instance information about memory or other resource shortages, disk space errors, and/or inability to connect to network(s).

Based on successful completion of the installation process, the process provides an adjusted refined task tree, incorporating the applied adjustment, as an optimized task tree for the deployment job (616), then ends.

Simulating the installation process of the deployment job using the task tree can include initially pruning the task tree to reduce a scale of the installation process of the deployment job. The simulating of the installation process will accordingly simulate the installation process for the reduced-scale of the installation process, and the invoking of the installation process of the deployment job invokes the installation process at full-scale.

The applying the adjustment (612) in some examples adjusts a task of the plurality of tasks by performing (i) adjusting a node of the task tree corresponding to the task, (ii) adjusting a script configured for execution to perform at least a portion of the task, (iii) adjusting at least one script fragment configured for execution to perform at least a portion of the task, and/or (iv) adjusting a portion of the configuration information related to the script or at least one script fragment configured for execution to perform at least a portion of the task.

Additionally or alternatively, applying the adjustment (612) to the refined task tree can include (i) automatically identifying and applying the adjustment based on script information saved in a script repository, the script information built based on execution of prior deployment jobs, and/or (ii) presenting error information about the recognized error to the user and receiving an indication of the adjustment from the user, as examples.

In some examples, applying the adjustment to the refined task tree includes clearing a reference to software, in the refined task tree, deemed to cause the recognized error.

In a particular example, applying the adjustment (612) adjusts an initial script or script fragment to provide an adjusted script or script fragment, and providing the optimized task tree provides the adjusted script or script fragment to a script optimization engine for further processing. An example of this further processing is described and depicted with reference to FIG. 8.

Figure 7:
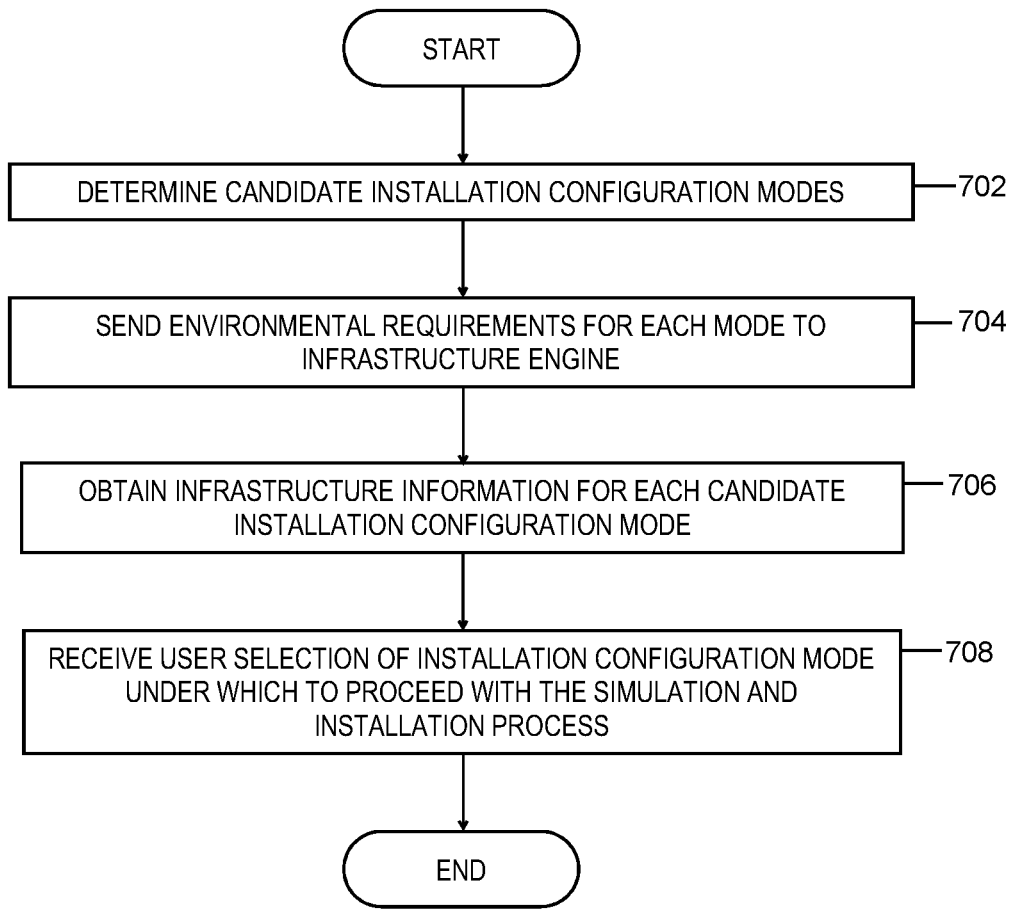
FIG. 7 depicts an example process for determining an installation configuration mode, in accordance with aspects described herein.

FIG. 7 depicts an example process for determining an installation configuration mode, in accordance with aspects described herein. The process may be performed by one or more computer systems, such as those described herein, which may include one or more cloud servers of an IaaS Platform, and/or one of more other computer systems. The process begins by determining a plurality of candidate installation configuration modes under which to execute the deployment process (702) and sending environmental requirements for each candidate installation configuration mode of the plurality of candidate installation configuration modes to an infrastructure engine of the compute infrastructure to which the one or more applications are to be deployed (704). Then, for each candidate installation configuration mode of the plurality of candidate installation configuration modes, the process obtains infrastructure information from the infrastructure engine (706). The infrastructure information informs of respective anticipated execution statistics of executing the deployment job under the candidate installation configuration mode.

The process receives from the user a selection of a candidate installation configuration mode of the plurality of candidate installation configuration modes under which to proceed with the simulating the installation process of the deployment job and the installation process of the deployment job (708), and ends.

Figure 8:
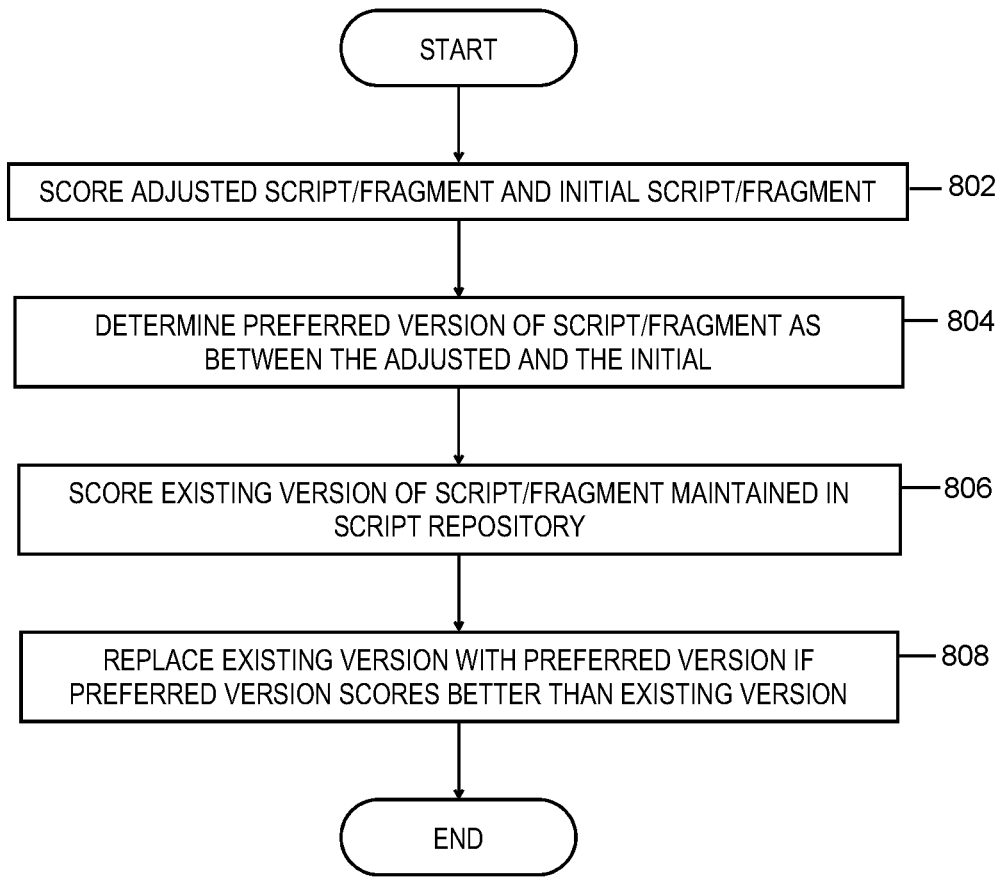
FIG. 8 depicts an example process of further processing an optimized task tree, in accordance with aspects described herein.

The applying of the adjustment (FIG. 6, #612) can adjust an initial script or script fragment to provide an adjusted script or script fragment, in which provision of the optimized task tree provides the adjusted script or script fragment to a script optimization engine for further processing. FIG. 8 depicts an example process of further processing of an optimized task tree, in accordance with aspects described herein. The process may be performed by one or more computer systems, such as those described herein, which may include one or more cloud servers of an IaaS Platform, and/or one of more other computer systems.

The process scores the adjusted script or script fragment and the initial script or script fragment (802) and determines, as between the two, a preferred version of the script or script fragment (804). Additionally, assuming an existing version of the script or script fragment exists in a script repository, the process scores that existing version of the script or script fragment maintained in the script repository (806). The process then replaces the existing version of the script or script fragment with the preferred script of script fragment based on the preferred script or script fragment scoring better than the existing version of the script or script fragment maintained in the script repository (808), and ends. If instead the existing version scores better than the preferred version, the preferred version may be discarded or stored as another version in the script repository. In this regard, scripts/fragments may be versioned in the script repository. When an existing version is replaced, it may be maintained as a prior version in the script repository.

In some examples, the scoring of each of the adjusted script or script fragment, initial script or script fragment, and existing script or script fragment includes using the respective script or script fragment in simulating (e.g. using the task simulator) the installation process of the deployment job.

Although various examples are provided, variations are possible without departing from a spirit of the claimed aspects.

Figure 9:
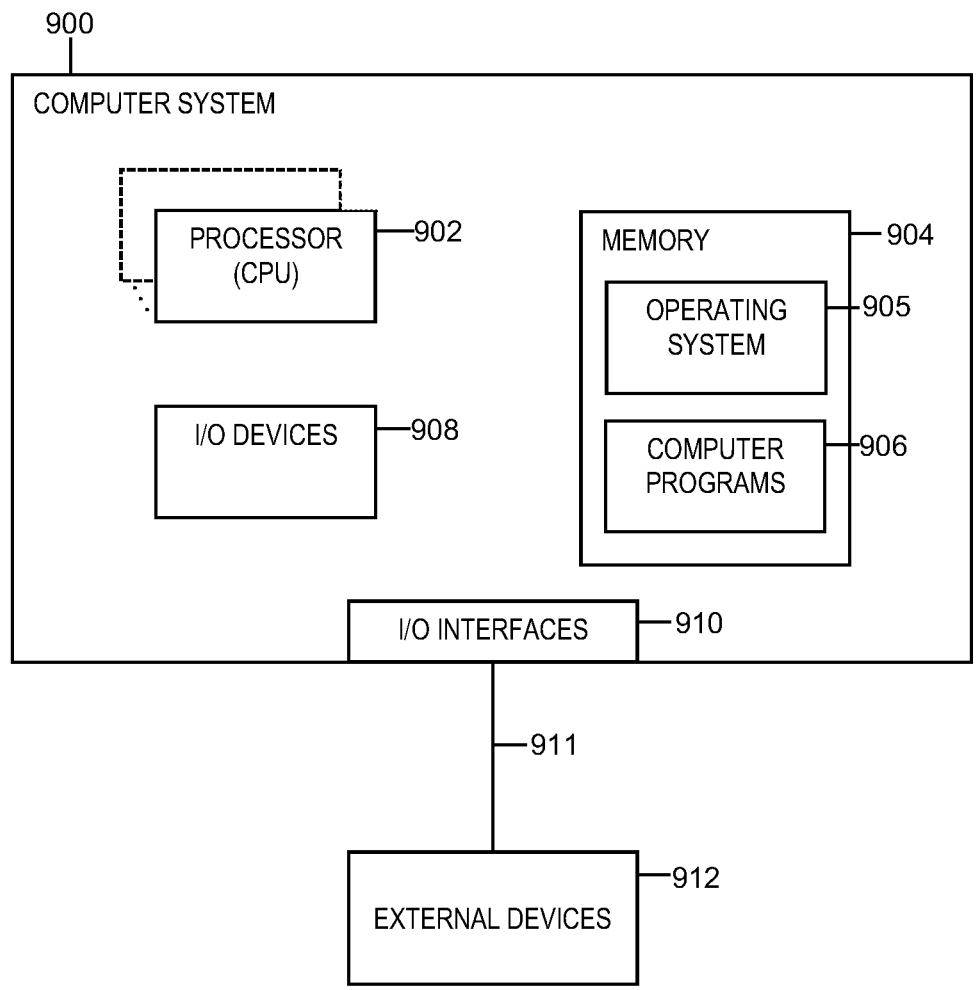
FIG. 9 depicts one example of a computer system and associated devices to incorporate and/or use aspects described herein.

Processes described herein may be performed singly or collectively by one or more computer systems, such as one or more computer systems of an IaaS platform or other platform, one or more computer systems of an administrator or other user, or a combination of the foregoing. FIG. 9 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), or Intel Corporation (Santa Clara, Calif., USA), as examples.

FIG. 9 shows a computer system 900 in communication with external device(s) 912. Computer system 900 includes one or more processor(s) 902, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 902 can also include register(s) to be used by one or more of the functional components. Computer system 900 also includes memory 904, input/output (I/O) devices 908, and I/O interfaces 910, which may be coupled to processor(s) 902 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 904 can be or include main or system memory (e.g. Random Access Memory) used in the execution of program instructions, storage device(s) such as hard drive(s), flash media, or optical media as examples, and/or cache memory, as examples. Memory 904 can include, for instance, a cache, such as a shared cache, which may be coupled to local caches (examples include L1 cache, L2 cache, etc.) of processor(s) 902. Additionally, memory 904 may be or include at least one computer program product having a set (e.g., at least one) of program modules, instructions, code or the like that is/are configured to carry out functions of embodiments described herein when executed by one or more processors.

Memory 904 can store an operating system 905 and other computer programs 906, such as one or more computer programs/applications that execute to perform aspects described herein. Specifically, programs/applications can include computer readable program instructions that may be configured to carry out functions of embodiments of aspects described herein.

Examples of I/O devices 908 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (912) coupled to the computer system through one or more I/O interfaces 910.

Computer system 900 may communicate with one or more external devices 912 via one or more I/O interfaces 910. Example external devices include a keyboard, a pointing device, a display, and/or any other devices that enable a user to interact with computer system 900. Other example external devices include any device that enables computer system 900 to communicate with one or more other computing systems or peripheral devices such as a printer. A network interface/adapter is an example I/O interface that enables computer system 900 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 910 and external devices 912 can occur across wired and/or wireless communications link(s) 911, such as Ethernet-based wired or wireless connections. Example wireless connections include cellular, Wi-Fi, Bluetooth®, proximity-based, near-field, or other types of wireless connections. More generally, communications link(s) 911 may be any appropriate wireless and/or wired communication link(s) for communicating data.

Particular external device(s) 912 may include one or more data storage devices, which may store one or more programs, one or more computer readable program instructions, and/or data, etc. Computer system 900 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 900 may be operational with numerous other general purpose or special purpose computing system environments or configurations. Computer system 900 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 10.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 10:
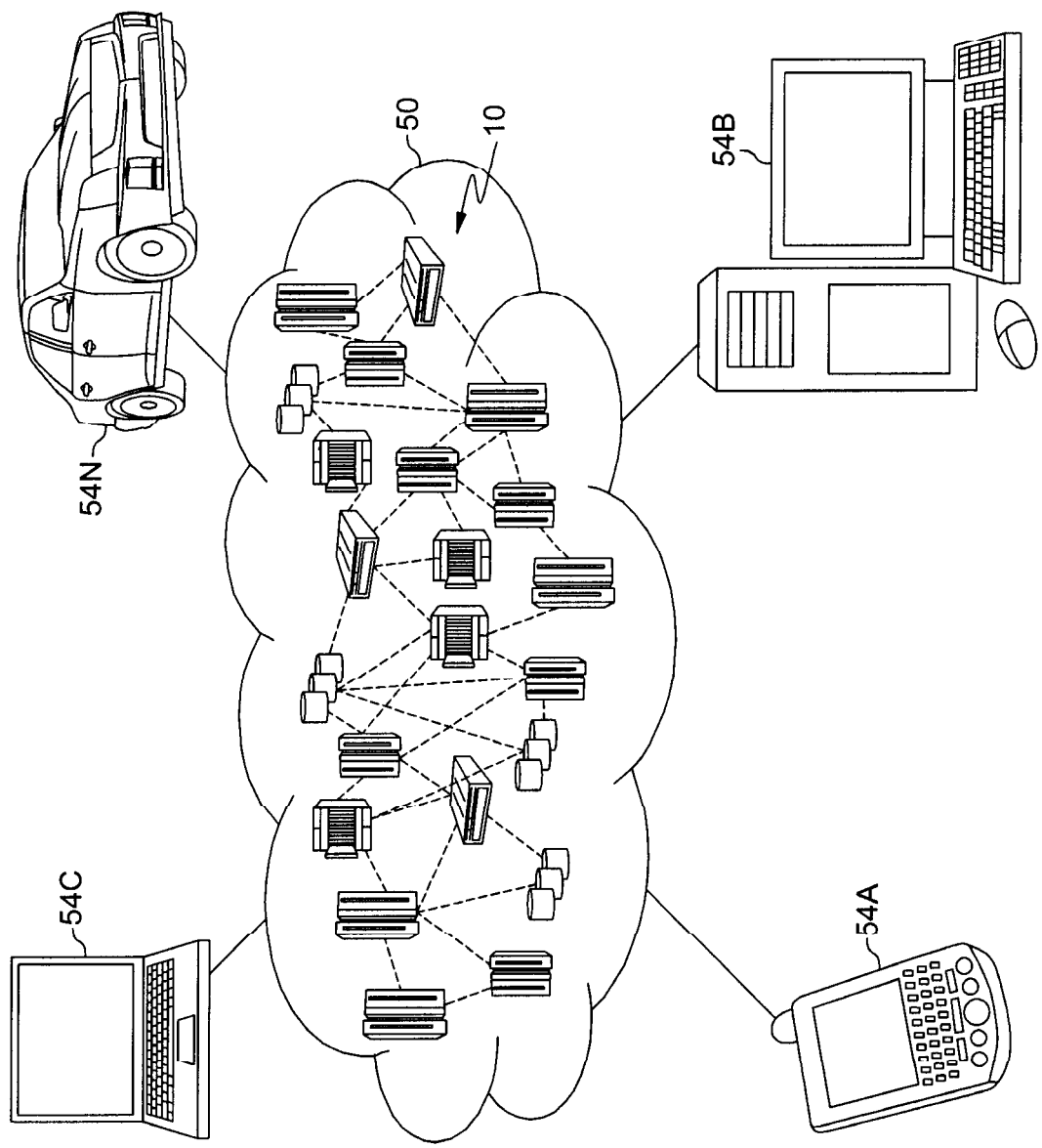
FIG. 10 depicts a cloud computing environment according to an embodiment of the present invention.

Referring now to FIG. 10, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
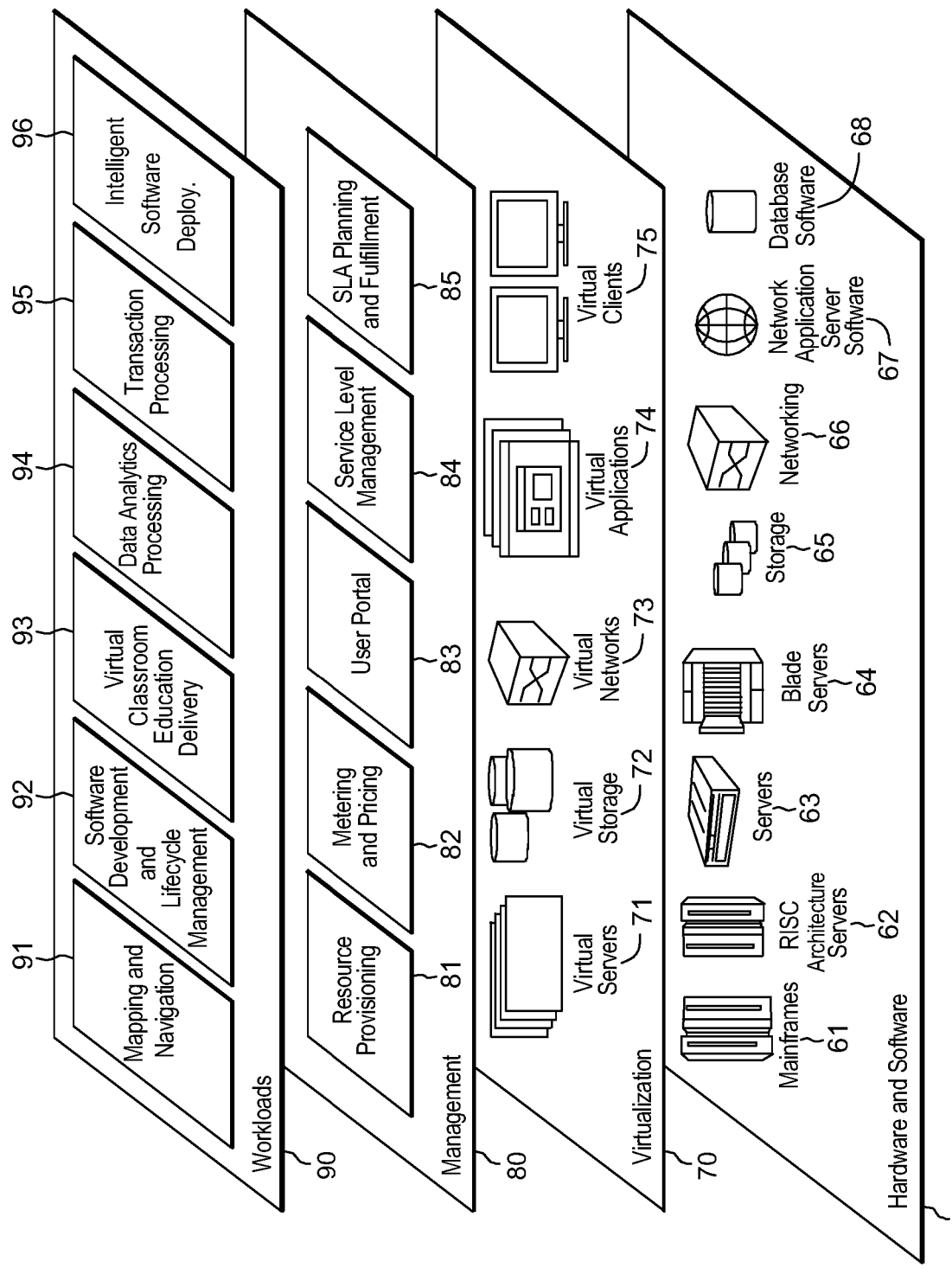
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and intelligent software deployment 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    obtaining a task tree for a deployment job to deploy one or more applications to a compute infrastructure, the task tree indicating a plurality of tasks to execute the deployment job;
    obtaining one or more scripts and related configuration information for executing the one or more scripts, wherein execution of the one or more scripts performs the plurality of tasks indicated by the task tree;
    simulating an installation process of the deployment job using the task tree, the simulating comprising refining the task tree using feedback from the simulated installation process, and the refining providing a refined task tree;
    based on successful simulation of the installation process, invoking the installation process of the deployment job, the installation process including execution of the plurality of tasks of the deployment job and using the refined task tree;
    completing at least one task, of the plurality of tasks, as part of the installation process;
    backtracking a portion of the installation process based on recognizing an error, the error recognized based on analyzing logged information about the installation process, the backtracking comprising:
        pausing the installation process and applying an adjustment to the refined task tree to resolve the error; and
        backtracking a portion of the installation process to a prior point of the installation process, the prior point being a point after the completion of the at least one task, and resuming the installation process from the prior point using the refined task tree with the applied adjustment;
    successfully completing the installation process to obtain an adjusted refined task tree that incorporates one or more adjustments made to the refined task tree as part of the installation process, the one or more adjustments including the applied adjustment to resolve the error;
    based on the successful completion of the installation process, providing the adjusted refined task tree that incorporates the one or more adjustments, including the applied adjustment to resolve the error, as an optimized task tree for the deployment job, wherein applying the adjustment updates a script, the script being for execution to perform one or more tasks of the optimized task tree, from an initial version of the script, prior to the updating, to a new version of the script;
    scoring the new version of the script and the initial version of the script, and comparing, based on the scoring, the new version of the script to the initial version of the script to determine whether the new version of the script, as part of the optimized task tree, provides a desired benefit relative to the initial version of the script; and
    based on the new version of the script scoring higher than the initial version of the script, determining that the new version of the script is preferred, and maintaining in a script repository the new version of the script as a current version of the script and the initial version of the script as a prior version of the script.

2. The method of claim 1, wherein the logged information about the installation process comprises hardware and connectivity information about the compute infrastructure.

3. The method of claim 1, wherein simulating the installation process of the deployment job using the task tree comprises initially pruning the task tree to reduce a scale of the installation process of the deployment job, the reduced-scale of the installation process comprising a reduction in resources of the deployment job as compared with resources of the deployment job of the installation process at full scale, wherein the simulating the installation process simulates the installation process for the reduced-scale of the installation process, and wherein the invoking the installation process of the deployment job invokes the installation process at full-scale.

4. The method of claim 1, further comprising:
determining a plurality of candidate installation configuration modes under which to execute the deployment process;
sending environmental requirements for each candidate installation configuration mode of the plurality of candidate installation configuration modes to an infrastructure engine of the compute infrastructure to which the one or more applications are to be deployed;
for each candidate installation configuration mode of the plurality of candidate installation configuration modes, obtaining infrastructure information from the infrastructure engine, the infrastructure information informing of respective anticipated execution statistics of executing the deployment job under the candidate installation configuration mode; and
receiving from the user a selection of a candidate installation configuration mode of the plurality of candidate installation configuration modes under which to proceed with the simulating the installation process of the deployment job and the installation process of the deployment job.

5. The method of claim 1, wherein the applying the adjustment adjusts a task of the plurality of tasks by performing at least one selected from the group consisting of: (i) adjusting a node of the task tree corresponding to the task, (ii) adjusting at least one script fragment configured for execution to perform at least a portion of the task, and (iii) adjusting a portion of configuration information related to a script or at least one script fragment configured for execution to perform at least a portion of the task.

6. The method of claim 1, wherein the new version of the script and the initial version of the script are provided to a script optimizer for further processing, the further processing comprising:
the scoring; and
as part of the maintaining, indicating the new version of the script as being a current version of the script to replace the prior version of the script.

7. The method of claim 6, wherein the scoring the new version of the script and the initial version of the script comprises using each of the new version of the script and the initial version of the script in simulating the installation process of the deployment job.

8. The method of claim 1, wherein the applying the adjustment to the refined task tree comprises at least one selected from the group consisting of: (i) automatically identifying and applying the adjustment based on script information saved in a script repository, the script information built based on execution of prior deployment jobs, and (ii) presenting error information about the recognized error to the user and receiving an indication of the adjustment from the user.

9. The method of claim 1, wherein the applying the adjustment to the refined task tree comprises clearing a reference to software, in the refined task tree, deemed to cause the recognized error.

10. The method of claim 1, further comprising providing to a user the feedback about the simulated application installation process, wherein the refining refines the task tree based on user interaction in response to the feedback.

11. The method of claim 1, wherein the simulating the installation process refines the task tree to result in a successful simulation of the installation process, wherein the successful simulation of the installation process is based on satisfying an adjustable criteria specifying a maximum number of errors permissible for a successful simulated installation process, the maximum number of errors permissible for a successful simulated installation being greater than zero.

12. A computer system comprising:
a memory; and
a processor in communication with the memory, wherein the computer system is configured to perform a method comprising:
obtaining a task tree for a deployment job to deploy one or more applications to a compute infrastructure, the task tree indicating a plurality of tasks to execute the deployment job;
obtaining one or more scripts and related configuration information for executing the one or more scripts, wherein execution of the one or more scripts performs the plurality of tasks indicated by the task tree;
simulating an installation process of the deployment job using the task tree, the simulating comprising refining the task tree using feedback from the simulated installation process, and the refining providing a refined task tree;
based on successful simulation of the installation process, invoking the installation process of the deployment job, the installation process including execution of the plurality of tasks of the deployment job and using the refined task tree;
completing at least one task, of the plurality of tasks, as part of the installation process;
backtracking a portion of the installation process based on recognizing an error, the error recognized based on analyzing logged information about the installation process, the backtracking comprising:
pausing the installation process and applying an adjustment to the refined task tree to resolve the error; and
backtracking a portion of the installation process to a prior point of the installation process, the prior point being a point after the completion of the at least one task, and resuming the installation process from the prior point using the refined task tree with the applied adjustment;
successfully completing the installation process to obtain an adjusted refined task tree that incorporates one or more adjustments made to the refined task tree as part of the installation process, the one or more adjustments including the applied adjustment to resolve the error;
based on the successful completion of the installation process, providing the adjusted refined task tree that incorporates the one or more adjustments, including the applied adjustment to resolve the error, as an optimized task tree for the deployment job, wherein applying the adjustment updates a script, the script being for execution to perform one or more tasks of the optimized task tree, from an initial version of the script, prior to the updating, to a new version of the script;

scoring the new version of the script and the initial version of the script, and comparing, based on the scoring, the new version of the script to the initial version of the script to determine whether the new version of the script, as part of the optimized task tree, provides a desired benefit relative to the initial version of the script, and based on the new version of the script scoring higher than the initial version of the script, determining that the new version of the script is preferred, and maintaining in a script repository the new version of the script as a current version of the script and the initial version of the script as a prior version of the script.

13. The computer system of claim 12, wherein the logged information about the installation process comprises hardware and connectivity information about the compute infrastructure.

14. The computer system of claim 12, wherein simulating the installation process of the deployment job using the task tree comprises initially pruning the task tree to reduce a scale of the installation process of the deployment job, the reduced-scale of the installation process comprising a reduction in resources of the deployment job as compared with resources of the deployment job of the installation process at full scale, wherein the simulating the installation process simulates the installation process for the reduced-scale of the installation process, and wherein the invoking the installation process of the deployment job invokes the installation process at full-scale.

15. The computer system of claim 12, wherein the applying the adjustment adjusts a task of the plurality of tasks by performing at least one selected from the group consisting of: (i) adjusting a node of the task tree corresponding to the task, (ii) adjusting at least one script fragment configured for execution to perform at least a portion of the task, and (iii) adjusting a portion of configuration information related to a script or at least one script fragment configured for execution to perform at least a portion of the task.

16. The computer system of claim 12, wherein the applying the adjustment to the refined task tree comprises at least one selected from the group consisting of: (i) automatically identifying and applying the adjustment based on script information saved in a script repository, the script information built based on execution of prior deployment jobs, and (ii) presenting error information about the recognized error to the user and receiving an indication of the adjustment from the user.

17. The computer system of claim 12, wherein the method further comprises providing to a user the feedback about the simulated application installation process, wherein the refining refines the task tree based on user interaction in response to the feedback.

18. A computer program product comprising:

a computer readable storage medium readable by a processor and storing instructions for execution by the processor for performing a method comprising:

obtaining a task tree for a deployment job to deploy one or more applications to a compute infrastructure, the task tree indicating a plurality of tasks to execute the deployment job;

obtaining one or more scripts and related configuration information for executing the one or more scripts, wherein execution of the one or more scripts performs the plurality of tasks indicated by the task tree;

simulating an installation process of the deployment job using the task tree, the simulating comprising refining the task tree using feedback from the simulated installation process, and the refining providing a refined task tree;

based on successful simulation of the installation process, invoking the installation process of the deployment job, the installation process including execution of the plurality of tasks of the deployment job and using the refined task tree;

completing at least one task, of the plurality of tasks, as part of the installation process;

backtracking a portion of the installation process based on recognizing an error, the error recognized based on analyzing logged information about the installation process, the backtracking comprising:

pausing the installation process and applying an adjustment to the refined task tree to resolve the error; and backtracking a portion of the installation process to a prior point of the installation process, the prior point being a point after the completion of the at least one task, and resuming the installation process from the prior point using the refined task tree with the applied adjustment;

successfully completing the installation process to obtain an adjusted refined task tree that incorporates one or more adjustments made to the refined task tree as part of the installation process, the one or more adjustments including the applied adjustment to resolve the error;

based on the successful completion of the installation process, providing the adjusted refined task tree that incorporates the one or more adjustments, including the applied adjustment to resolve the error, as an optimized task tree for the deployment job, wherein applying the adjustment updates a script, the script being for execution to perform one or more tasks of the optimized task tree, from an initial version of the script, prior to the updating, to a new version of the script;

scoring the new version of the script and the initial version of the script, and comparing, based on the scoring, the new version of the script to the initial version of the script to determine whether the new version of the script, as part of the optimized task tree, provides a desired benefit relative to the initial version of the script; and based on the new version of the script scoring higher than the initial version of the script, determining that the new version of the script is preferred, and maintaining in a script repository the new version of the script as a current version of the script and the initial version of the script as a prior version of the script.

19. The computer program product of claim 18, wherein the logged information about the installation process comprises hardware and connectivity information about the compute infrastructure.

20. The computer program product of claim 18, wherein the applying the adjustment to the refined task tree comprises at least one selected from the group consisting of: (i) automatically identifying and applying the adjustment based on script information saved in a script repository, the script information built based on execution of prior deployment jobs, and (ii) presenting error information about the recognized error to the user and receiving an indication of the adjustment from the user.

\* \* \* \* \*